United States Patent [19]

Curry

[11] Patent Number: 4,639,789
[45] Date of Patent: Jan. 27, 1987

[54] RASTER SCANNER VARIABLE-FREQUENCY CLOCK CIRCUIT

[75] Inventor: Douglas N. Curry, Menlo Park, Calif.

[73] Assignee: Xerox Corporation, Stamford, Conn.

[21] Appl. No.: 615,002

[22] Filed: May 29, 1984

[51] Int. Cl.⁴ .......................... H04N 1/04; H04N 1/36
[52] U.S. Cl. ..................... 358/285; 328/63; 358/264; 358/267; 377/50
[58] Field of Search ............... 358/285, 293, 294, 199, 358/204, 264, 267; 350/6.7, 6.8; 250/236; 375/119, 118; 328/63, 134; 377/50, 48

[56] References Cited

U.S. PATENT DOCUMENTS

| | | | |
|---|---|---|---|
| 3,384,821 | 5/1968 | Beck | 375/119 |
| 3,848,087 | 11/1974 | Carrell | 358/264 |
| 4,130,838 | 12/1978 | St. John | 358/267 |
| 4,140,903 | 2/1979 | Clark | 350/6.7 |
| 4,190,867 | 2/1980 | Ohuishi | 358/285 |
| 4,204,233 | 5/1980 | Swager | 358/293 |
| 4,225,824 | 9/1980 | Sekine et al. | 328/63 |
| 4,268,867 | 5/1981 | Traino | 358/285 |
| 4,308,544 | 12/1981 | Lucero et al. | 358/285 |
| 4,320,420 | 3/1982 | Rider | 358/267 |
| 4,349,847 | 9/1982 | Traino | 358/264 |
| 4,400,817 | 8/1983 | Sumner | 328/63 |
| 4,508,422 | 4/1985 | Karlsson | 250/236 |
| 4,540,945 | 9/1985 | Kuroki | 328/63 |

OTHER PUBLICATIONS

"Correcting Method for Light Scanning Error of Rotating Polygon Mirror", IEEE-Denshi Tsushin Gakkai of Japan, vol. J66, No. 2, Tadashi Matsuda et al.

"A Correction Method for Laser Scanning Errors in High Speed Laser Prints", Fujitsu Sci. and Tech., vol. 18, No. 4, pp. 579–594, Tomohisa Mikami et al.

*Primary Examiner*—James J. Groody
*Attorney, Agent, or Firm*—Robert E. Cunha

[57] ABSTRACT

A circuit for correcting for polygon drive motor velocity irregularities in a flying spot scanner is described. A crystal controlled oscillator is used to generate the system clock. As the motor speeds up, or slows down, pulses are subtracted, or added, to the stream of clock pulses so that the data bit stream will always occupy the same line length on the page regardless of polygon velocity variations.

5 Claims, 9 Drawing Figures

TO & FROM FIG. 4B

RASTER SCANNER VARIABLE-FREQUENCY CLOCK CIRCUIT

The described circuit electronically corrects for polygon drive motor velocity irregularities in a laser driven raster output scanner of a hard copy printer, or a laser driven raster input scanner for scanning input documents, or the like.

In a non-impact printer having a raster output scanner, it is typical to use a rotating polygon in a flying spot scanner for scanning a xerographic drum. However, the resultant copy quality is frequently impaired to some extent in this type of system because of imperfections in the drive motor, mechanical attachments and control circuit which result in slight variations in the rotational velocity of the polygon. In a printer, as the polygon slows, while the data is being coupled in at a constant rate, the raster lines will become shorter. Similarly, as the polygon speeds up, the data will be spread over a wider area.

In a similar manner, a raster input scanner employing a rotating polygon to displace a spot for scanning an input document will accumulate data rasters which need to be corrected because of the slight variations in the rotational velocity of the polygon. As the polygon slows, while the data is being coupled out at a constant rate, the number of bits of data accumulated across a constant width of the input document will increase. Similarly, as the polygon speeds up, fewer bits of data will be accumulated across a constant width of the input document.

One solution is the use of a large and accurate motor and servo system to control the polygon velocity, but cost is a problem, both in terms of price and size.

A lower cost alternative is to accept slight variations in polygon velocity and correct for them in an electronic circuit. One solution is described in commonly assigned U.S. Pat. No. 4,320,420, Hybrid Bit Clock Servo, by Ronald E. Rider and U.S. Pat. No. 4,204,233, Electronic Facet Error Correction for Laser Scanning, by Gary E. Swager. The speed of the polygon is measured digitally by counting the number of clocks that occur during a predetermined amount of polygon rotation. This velocity information is then converted into an analog voltage which is used to adjust a voltage controlled oscillator, the output of which is used as the system clock. In this way the data rate is matched to the polygon rate, whatever that happens to be. For instance, when the polygon velocity increases, which would tend to spread out the printed data, the clock frequency is raised, tending to compress the data back into its appropriate length.

An alternative is to use an all-digital circuit to effect this correction. A digital circuit, controlled by a crystal oscillator, would be more reliable and less variable but a crystal controlled oscillator cannot be adjusted. The inventor in this case has overcome this limitation by using a crystal oscillator to generate a stream of high frequency clock pulses, called "sample clocks" in the discussion, and by occasionally removing a sample clock pulse to vary the apparent frequency at the data clock output. During a scan, removing more sample clock pulses lowers the effective frequency, removing less raises it. The removal of sample clock pulses is spread out over the entire scan, and the frequency is counted down by a significant factor before being used by the data input or output circuit, the result being an unnoticeable local variation of space width during scanning.

An additional advantage of this circuit is that it can correct for polygon velocity variations with a one scan latency, instead of a full rotation latency. In order to do this, it is necessary to predetermine, during a calibration procedure, a unique nominal velocity for each facet pair on the polygon. Then, during actual input or output scanning, the velocity of the spot can be measured and the difference between the actual and the nominal velocities may be used for correcting the next scan. The measurement time period is from the end of one scan to the end of the next scan. The circuit then uses the time from that scan end until the next scan start to compute and implement the correction.

Using this circuit, even velocity variations that last for a fraction of a polygon rotation can be corrected. It also may be convenient to use information from previous scans to discover a trend in the motor hunt to delay correction until a large enough trend is perceived. The microprocessor may also be used to implement a correction system which has filtering properties, such as attenuated or amplified response to various frequency components in the hunt.

Since the nominal velocity is measured by timing the spot from end-of-scan of one facet to the end-of-scan of the adjacent facet, and these facet-to-facet times may vary among the facet pairs due to polygon dimensions, it is necessary to collect a separate set of data for the nominal velocity for each facet pair on the polygon. For instance, a twelve sided polygon would have twelve facet pairs, with the end-of-scan to end-of-scan time for each pair being unique.

In order to obtain high quality nominal velocity information for each facet pair, the microprocessor collects end-of-scan to end-of-scan times for each facet pair for many revolutions of the polygon, then divides by that number of revolutions to obtain an average. This minimizes random error in the measurement.

In fact, each facet pair count will have a variation from nominal consisting of two components, a unique facet-to-facet variation for each facet pair and any variation in motor velocity. However, the motor velocity variations tend to affect all facet pairs equally. Therefore, when differences between facet pairs are generated, the motor velocity factor will be subtracted out.

This invention will be more readily understood in relation to the following drawings.

DETAILED DESCRIPTION OF THE DRAWINGS

Figure 1:
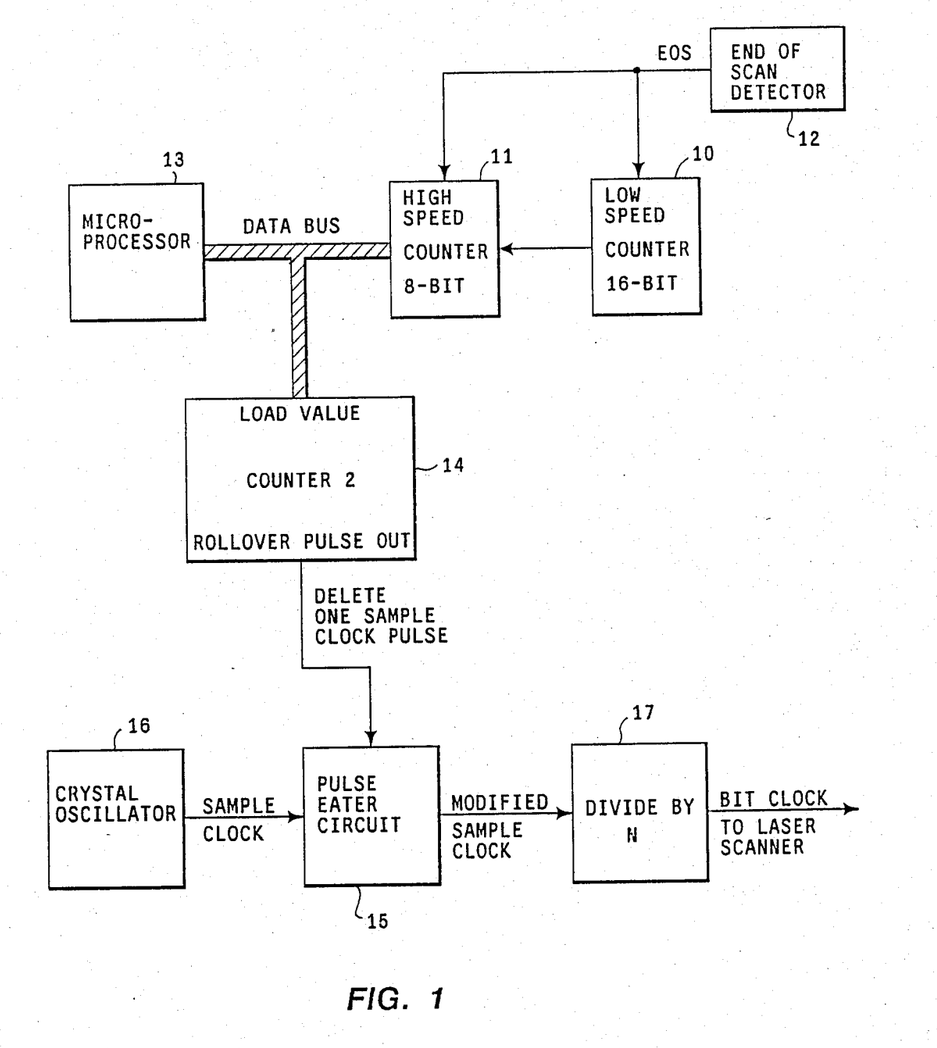
FIG. 1 is a simplified block diagram of the circuit.

In FIG. 1, an end-of-scan detector 12 generates an end-of-scan pulse at the end of each scan and applies it to a 16-bit counter 10 and high speed, 8-bit counter 11. At each end-of-scan pulse, the 16-bit counter 10 begins to count sample clock pulses for most of the scan. Just before the next end-of-scan pulse is expected, the counter 10 issues an overflow pulse, which reloads and stops itself and also starts the high speed, 8-bit counter. At the next end-of-scan pulse, the high speed counter is stopped, and the 16-bit counter 10 begins again to count pulses. The high speed counter value, the facet-to-facet time (minus the constant count of the 16-bit counter 10), is then available to the microprocessor 13.

During a calibrate phase, the microprocesor 13 adds facet-to-facet times for each pair of adjacent facets during R revolutions of the polygon and divides each by R to get a nominal motor velocity value for each facet pair. In this system, R=256. The system may be calibrated any time it is not otherwise in use.

During regular use, the value from the high speed counter is taken by the microprocessor and compared to the stored nominal value to produce a difference. For a numerical example, let us assume that the difference is three; that is, the polygon velocity at the moment is the equivalent of three sample clock pulses per scan too slow. Then the processor could divide the number of sample clocks per scan by the difference number to get a correction number, and will delete one pulse from the sample clock pulse stream during the next scan for each difference number of clock pulses. To continue using the numerical example, if there are 12,000 nominal sample clocks per scan (for a twelve sided polygon, a scan in this case is one twelfth of a revolution), and the scan pulse difference is three pulses too slow, then a sample clock pulse could be removed once for each four thousand sample clock pulses generated. This would place the correction at sample clock numbers 4,000, 8,000 and 12,000.

A better correction method would be to divide the number of sample clocks per scan by one more than the scan pulse difference, so that the correction pulses would be spaced more evenly throughout the scan. To use the above example, if the scan pulse difference is three pulses too slow, the number of sample clocks per scan, 12,000, would be divided by four. Then the correction pulses will occur at points in the line corresponding to sample clock numbers 3,000, 6,000 and 9,000.

An alternative is for the microprocessor to use a table look-up to generate the correction number. This would be needed if the microprocessor was unable to directly calculate the needed correction value in time from end-of-scan of one raster to the start-of-scan of the next raster. The numbers could be pre-calculated and stored in memory.

In FIG. 1, the microprocessor 13 will calculate the correction number, and output it to counter 14, which produces a pulse for each correction number of input pulses. This pulse is sent to the pulse eater circuit 15 which, for each correction pulse, deletes a clock pulse from the stream of sample clock pulses received from the sample clock generator 16. The remaining pulses are coupled to the divider 17 to produce the bit clock which is the one that is actually used to control the data to the raster output scanner or raster input scanner.

One characteristic of the system which must be compensated for is that pulses may be subtracted from the stream of sample clock pulses to decrease the bit clock frequency if the polygon is rotating too slowly, but pulses cannot be added if the polygon frequency is too fast. In order to have a range of adjustment in both directions, the system is set up so that the nominal speed will correspond to a subtraction of a number of pulses which puts the system in the middle of its range. Again, to use a simple numerical example, if the system is set up so that from zero to 255 pulses may be subtracted, then the most likely nominal velocity is set to be one that will require the subtraction of 128 pulses. Then, the system can be speeded or slowed.

Figure 2:
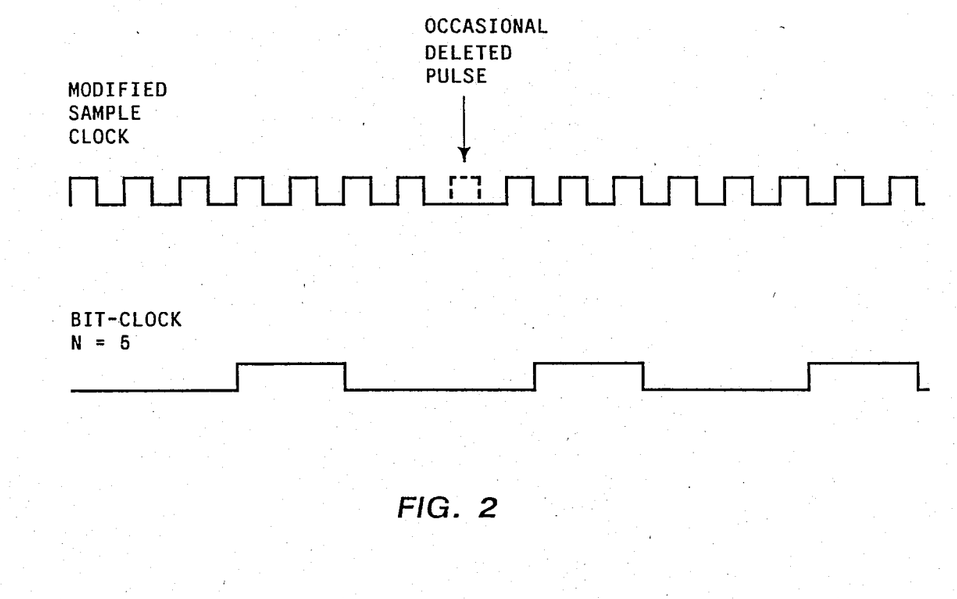
FIG. 2 shows two typical clock waveshapes.
Figure 3A:
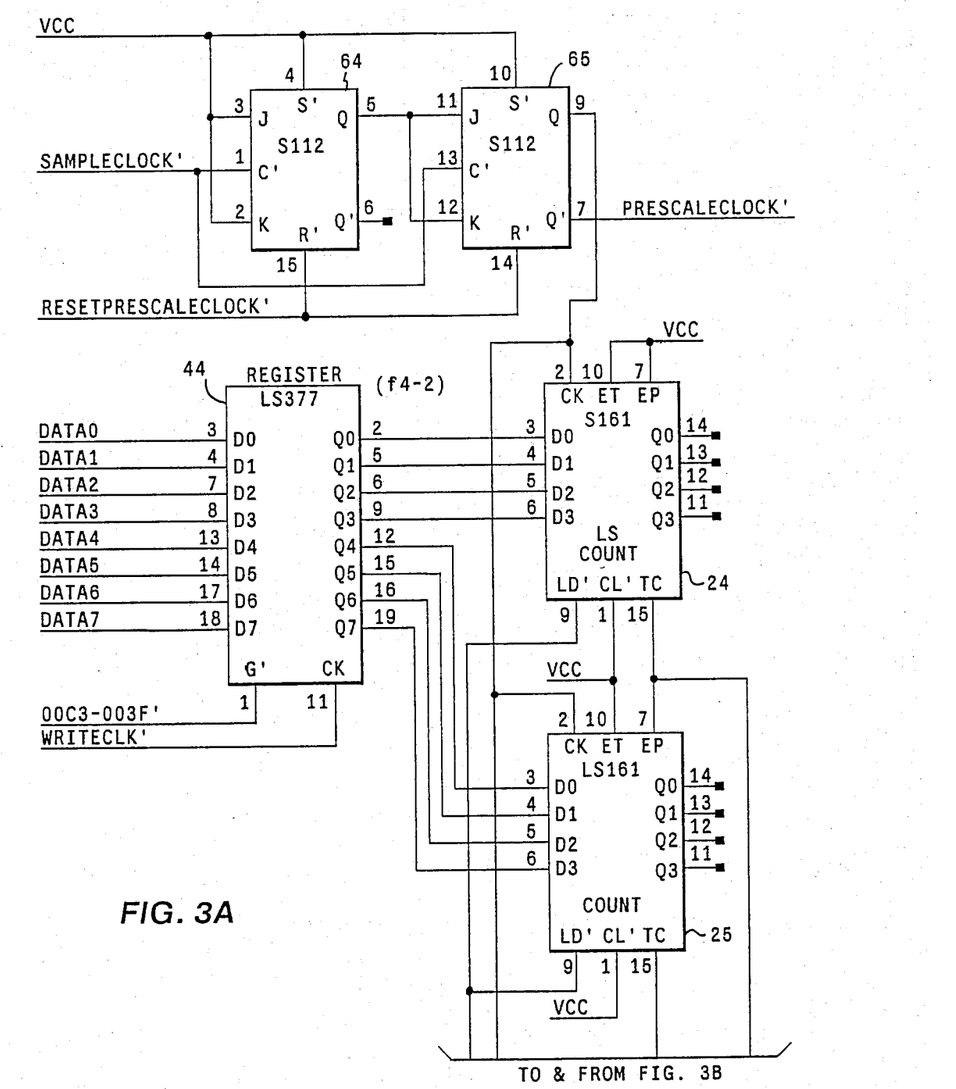
FIGS. 3A-D and 4A-C are schematic drawings of the circuit.
Figure 3B:
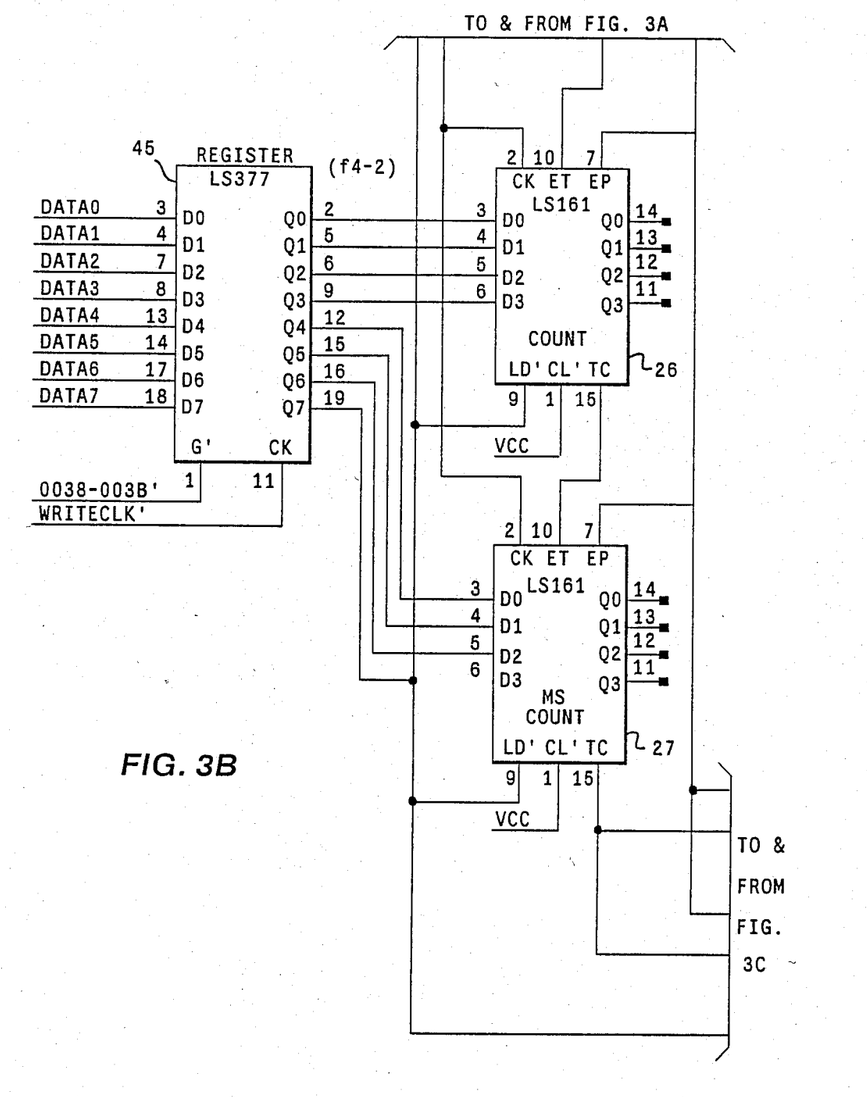
Figure 3C:
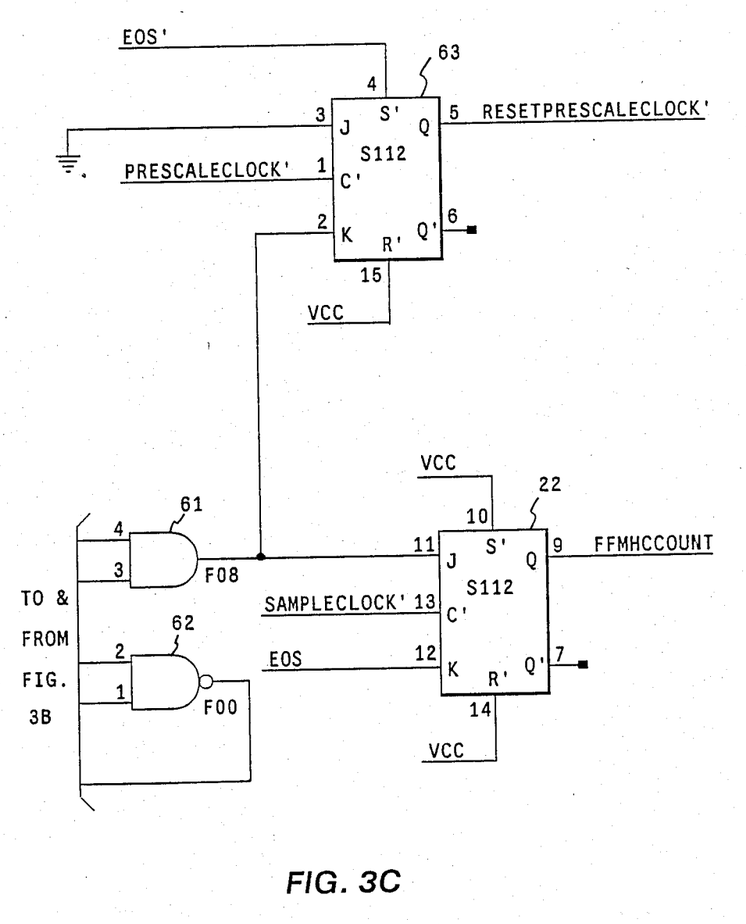
Figure 3D:
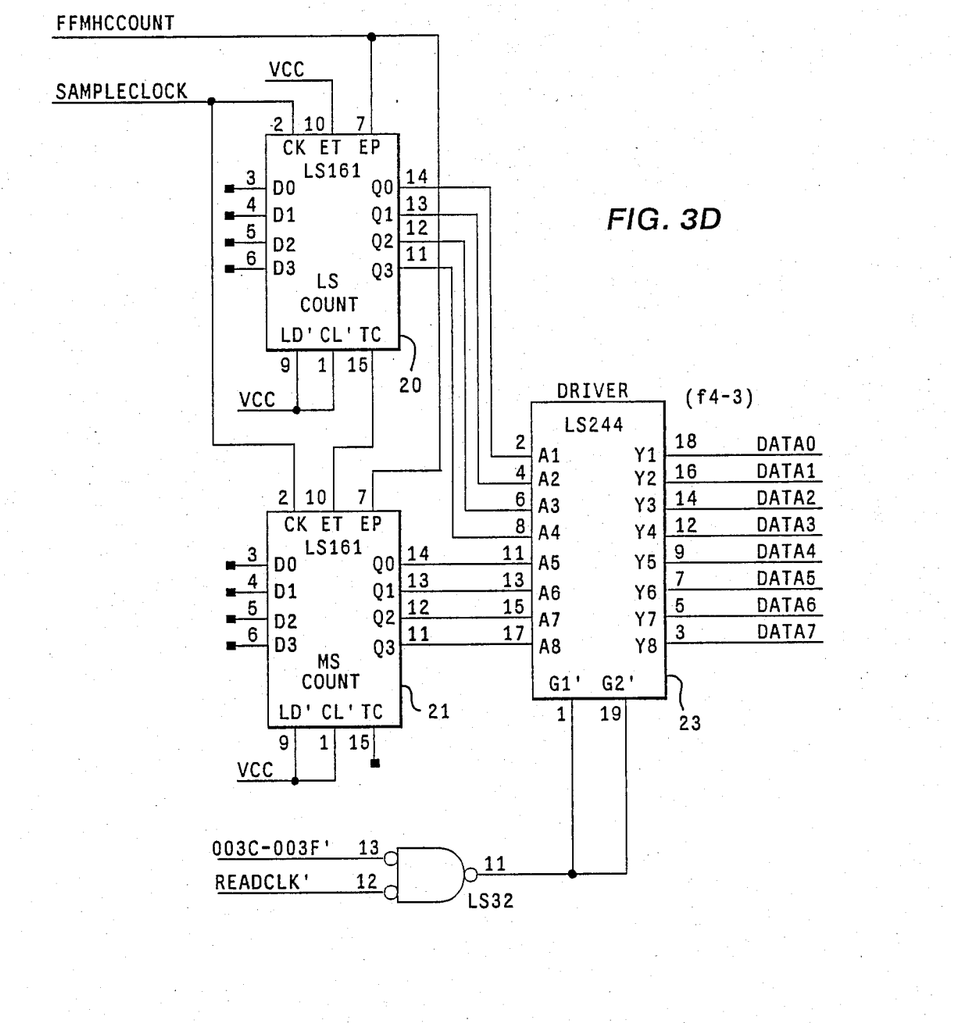

The corresponding waveshapes are illustrated in FIG. 2. The modified sample clock shows a stream of sample clocks with one deleted. After the divide by N circuit (N=5), the bit clock is shown. The bit clock waveshape is slightly elongated at the point where the sample clock was deleted. By using a large enough N, the elongation can be kept below the threshold of perceptibility for most intended uses.

The circuit details are shown in FIGS. 3A-D and 4A-C and will be discussed first in relation to the calibration process and then in relation to actual use.

The clocks used for the low speed 16-bit counter are received on the line label led SampleClock' and are generated at a frequency of 44 MHz. The data lines from the microprocessor are labeled Data0 to Data7 and are coupled through register 44, 45 to the parallel load inputs of a sixteen bit counter 24, 25, 26, 27. Since 44 MHz is too high a frequency for the sixteen bit synchronous TTL counter, this frequency is counted down in the 4-to-1 divider 64, 65 to 11 MHz.

The overflow pulse out of the sixteen bit counter 24–27 is used to start an 8-bit counter 20, 21 which can count at the full 44 MHz. The microprocessor may access the count from the high speed counter when it is not counting through driver 23.

The sixteen bit counter accurately counts most of the scan time. The microprocessor will supply a number which will cause the sixteen bit counter to issue an overflow at a time which is slightly before the anticipated end-of-scan time. This number is not changed or modified during either calibration or actual scanning. The number supplied is actually the two's compliment of the number (which is equal to FFFF (hexadecimal) minus the number plus one), since the counter is counting up rather than down.

This number is chosen so that there will be an overflow (all sixteen bits=FFFF hexadecimal) pulse approximately 128 sample clock pulses before the actual end of scan. This overflow pulse is coupled through gate 62 to reload the counter 24–27 with the original number, and is also coupled through gate 61 to turn of flip-flop 63, the output off which turns off and resets the 4-to-1 divider 64, 65 for the moment.

At the same time, the output of flip-flop 22 momentarily goes high enabling counter 20, 21, which counts approximately 128 clocks from this point in time until the actual end of the scan. This count will vary depending on the motor velocity and is sent to the microprocessor through driver 23 as the indication of the motor velocity.

When the end of scan actually occurs, the "End of Scan" signal (EOS) occurs, which turns on flip-flop 63, allowing the divider 64, 65 to again allow pulses to be sent to the counter 24–27. Also, the EOS signal turns off flip-flop 22, stopping counter 20, 21, which can be read by the microprocessor.

Counter 20, 21 is a modulo 256 counter and is never reset, but simply rolls over from FF (hexidecimal) to 00 (hexidecimal) and continues counting. Since the microprocessor knows the previous value of the counter 20, 21 from the last scan, the value of the counter from the last scan may be subtracted from the value from the current scan to obtain the absolute directed difference, which represents the current scan time. This arithmetic is accomplished in the microprocessor by taking the two's complement of the subtrahend, then adding the two numbers modulo 256. This results in a number between zero and 255, and will tend to be around 128 if the motor is not hunting, or will deviate from 128 as the motor hunts. This entire process is repeated a large number of times, 256 for example, to allow the microprocessor to average the values and produce accurate nominal values of motor velocity for each facet pair, which are stored in memory. This concludes the calibrate phase.

During operation, all of the above circuitry operates identically as described above except that when the microprocessor receives the pulse count from the counter 20, 21, it will compare it to the nominal motor velocity it has already calculated, and produce a correction number as described above. This correction number is received at register 28, 29 (FIGS. 4A-C) and is used to load counter 74-77. At the end of each count period, an output pulse will be coupled through gates 30 and 51 to restart the counter 74-77. Also, the pulse will be coupled through gate 30 to the "pulse eater" circuitry comprising flip-flops 31, 32 and gates 33, 34. The sample clock pulse stream is also supplied to the pulse eater circuit.

Figure 4A:
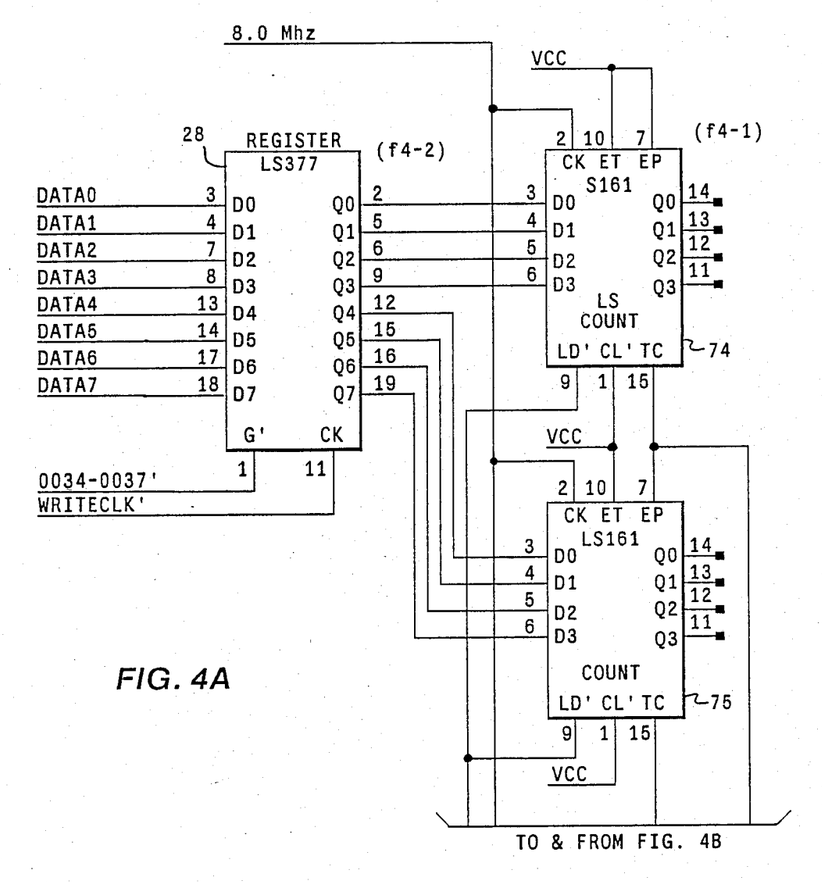
Figure 4B:
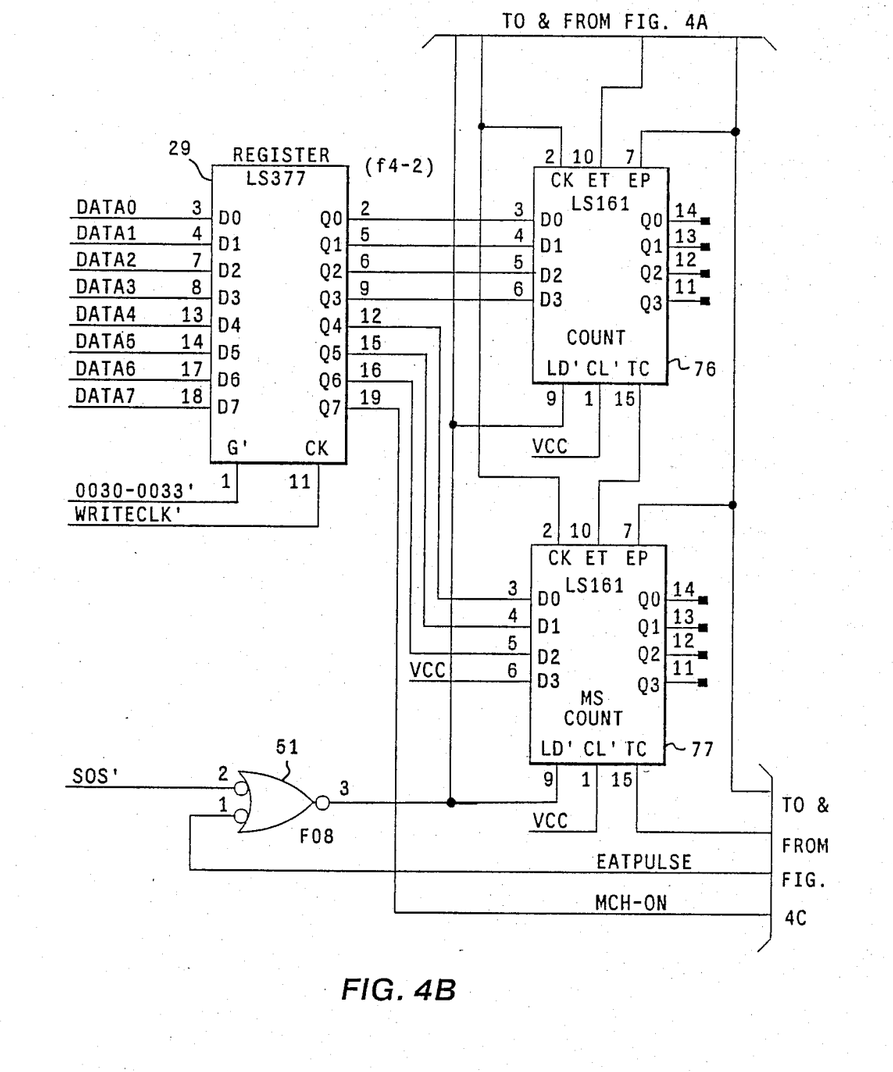
Figure 4C:
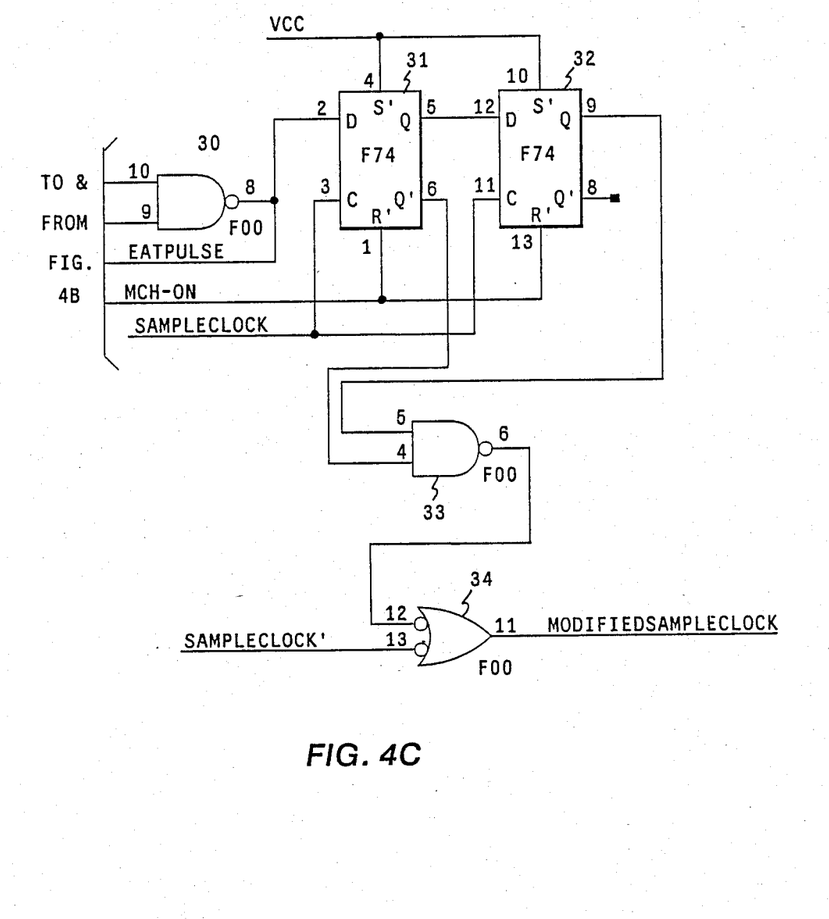

The effect is to delete one sample clock pulse from the stream for each correction pulse received, the output being the modified sample clock to the raster output scanner comprising a laser modulator, the raster input scanner comprising data detection circuitry, or the like.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

I claim:
1. A digital circuit for varying the frequency of the bit clock in a raster input or output scanner comprising:
   a sample clock generator,
   means for measuring each scan duration,
   means responsive to said measurement for deleting an evenly spaced number of sample clock pulses per scan, said number of deleted pulses per scan being a function of said measured scan duration, and
   means for counting down the output of the means for deleting to produce the bit clock for the next scan.
2. The circuit of claim 1 wherein said sample clock generator is crystal controlled.
3. The circuit of claim 1 wherein said means for measuring measures from the end of one scan to the end of the next.
4. A digital circuit for varying the bit clock frequency of a raster scanner comprising
   a sample clock generator,
   means for measuring the scan duration of each scan,
   calculating means responsive to said scan duration for calculating the number of clocks per scan that must be deleted from the sample clock generator output for the next scan,
   means for deleting from the clock generator output the calculated number of clocks, and
   a divider for dividing the frequency of the output of the means for deleting to produce a bit clock.
5. The circuit of claim 4 wherein said calculating means further comprises means for calculating periodic variations in scan duration that do not vary as a function of time by averaging a large number of scan durations, and using this periodic variation to correct the current scan duration prior to calculating said number.

* * * * *